US012339977B2

(12) United States Patent
Kumar et al.

(10) Patent No.: US 12,339,977 B2
(45) Date of Patent: Jun. 24, 2025

(54) AUTHORIZING ENTERPRISE MODULAR CHASSIS COMPONENT MOVEMENT USING FULLY HOMOMORPHIC ENCRYPTION

(71) Applicant: Dell Products L.P., Round Rock, TX (US)

(72) Inventors: Suren Kumar, Bangalore (IN); Vasanth Kumar V, Bengaluru (IN); Akbar Sheriff, Salem (IN)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 18/082,029

(22) Filed: Dec. 15, 2022

(65) Prior Publication Data
US 2024/0202348 A1    Jun. 20, 2024

(51) Int. Cl.
*G06F 21/60*  (2013.01)
*G06F 21/72*  (2013.01)

(52) U.S. Cl.
CPC ............ *G06F 21/602* (2013.01); *G06F 21/72* (2013.01)

(58) Field of Classification Search
CPC ............................... G06F 21/602; G06F 21/72
See application file for complete search history.

(56) References Cited

U.S. PATENT DOCUMENTS

| 10,140,457 | B2 | 11/2018 | McGowan |
| 11,157,623 | B2 | 10/2021 | Pappachan et al. |
| 11,593,526 | B1* | 2/2023 | Mensch ................. G06F 21/73 |
| 2015/0113106 | A1* | 4/2015 | Consul ............... H04L 41/0853 |
| | | | 709/221 |
| 2017/0336841 | A1* | 11/2017 | Ragupathi ................ G06F 1/26 |
| 2018/0351790 | A1* | 12/2018 | Khemani ................ H04L 41/08 |
| 2020/0252388 | A1* | 8/2020 | Tran ..................... H04W 12/084 |
| 2021/0297330 | A1* | 9/2021 | Li ........................... H04L 41/28 |
| 2024/0178988 | A1* | 5/2024 | Schroepfer ............. H04L 9/008 |

* cited by examiner

*Primary Examiner* — Sangseok Park
(74) *Attorney, Agent, or Firm* — Larson Newman, LLP

(57) ABSTRACT

An information handling system includes an add-in slot and a baseboard management controller (BMC). The add-in slot receives components of a particular type. The BMC receives an identifier from a particular component installed into the add-in slot. The identifier uniquely identifies the component from any other component of the same type. The BMC further determines whether or not a first entry in an encoded component table includes the first identifier, determines an action to perform for the component in response to determining that the entry includes the identifier, and performs the action for the component. The first entry is associated with the first add-in slot.

18 Claims, 4 Drawing Sheets

US 12,339,977 B2

AUTHORIZING ENTERPRISE MODULAR CHASSIS COMPONENT MOVEMENT USING FULLY HOMOMORPHIC ENCRYPTION

FIELD OF THE DISCLOSURE

This disclosure generally relates to information handling systems, and more particularly relates to the authorizing enterprise modular chassis component movement using fully homomorphic encryption.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include an add-in slot and a baseboard management controller (BMC). The add-in slot may receive components of a particular type. The BMC may receive an identifier from a particular component installed into the add-in slot. The identifier may uniquely identify the component from any other component of the same type. The BMC may further determine whether or not a first entry in an encoded component table includes the first identifier, determine an action to perform for the component in response to determining that the entry includes the identifier, and perform the action for the component. The first entry may be associated with the first add-in slot.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
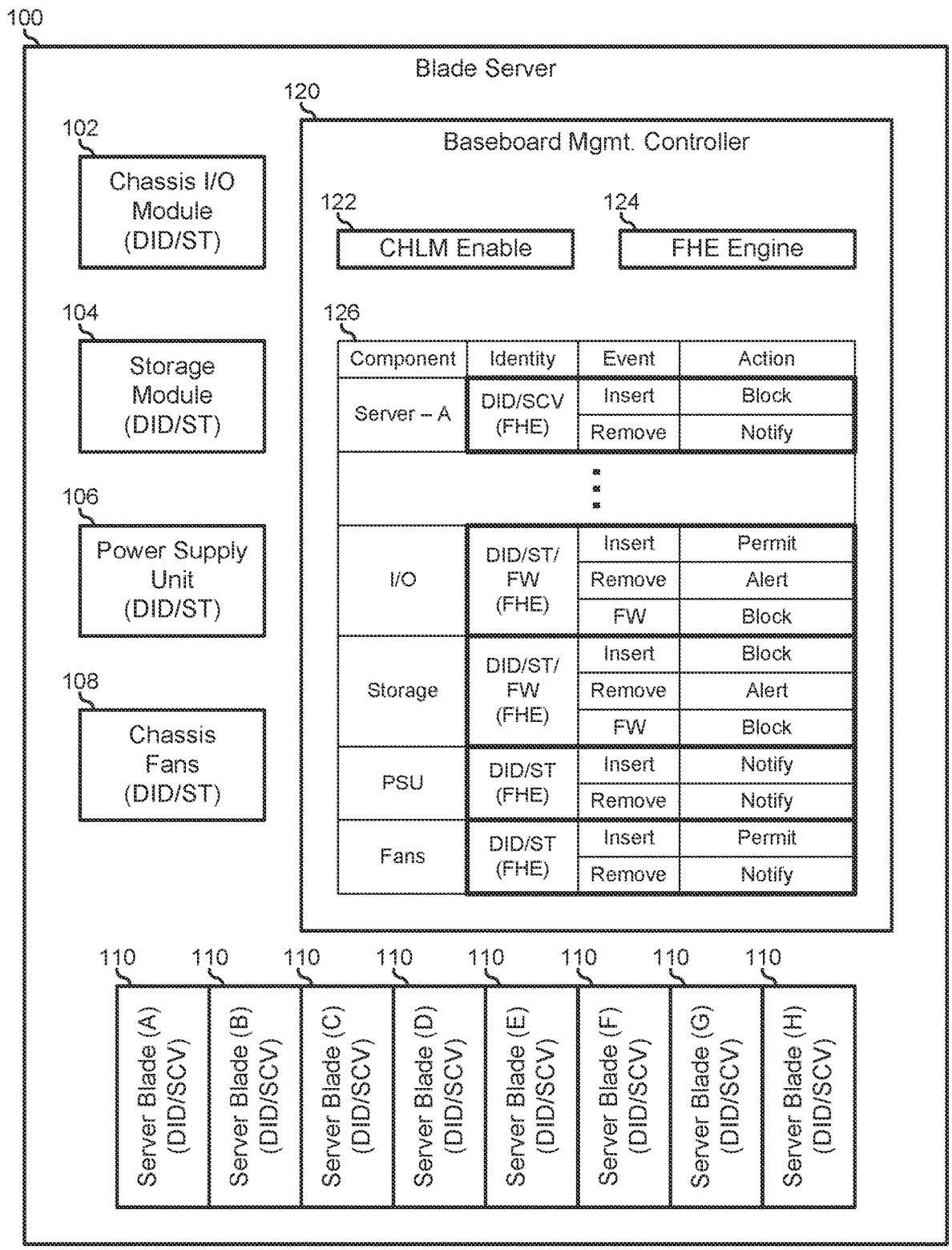
FIG. 1 is a block diagram of an information handling system according to an embodiment of the current disclosure.

FIG. 1 illustrates an information handling system 100. Information handling system 100 is illustrated in an exemplary embodiment as a blade server. However, it should be understood that other types of information handling systems would be expected to utilize the teachings of the current disclosure, as needed or desired. Information handling system 100 represents an integrated, rack-mounted computing system that is typically provided in a form factor suitable for mounting in a server rack, and that provides a scalable and highly configurable computing capacity for the datacenter, as needed or desired. As such, information handling system 100 represents a stand-alone computing system that integrates a chassis input/output (I/O) module 102, a storage module 104, a power supply unit (PSU) 106, chassis fans 108, server blades 110 (here illustrated with a typical eight (8) server blades), and a baseboard management controller (BMC) 120. Server blades 110 represent the core computing functionality of information handling system 100, and may be utilized for stand-alone computing applications, or for highly virtualized computing environments.

Chassis I/O module 102 provides a local network interface for information handling system 100 and switching of the network traffic between the target blade servers 110 and an external network switch, such as a top-of-rack (TOR) switch (not illustrated). Storage module 104 represents an array of data storage devices in information handling system 100 that operate to provide local data storage for blade servers 110, permitting faster data access than would be provided by data storage access through chassis I/O module 102. PSU 106 receives power from a power distribution unit (PDU) typically associated with a server rack, and converts the received power to the various power rails utilized by the other components of information handling system 100, as needed or desired. Chassis fans 108 provide a cooling airflow from a cool aisle of a datacenter to cool the components of information handling system 100. Server blades 110 represent modular processing devices of information handling system 100 that provide the processing functionality typically associated with the information handling system.

Chassis I/O module 102, storage module 104, PSU 106, and chassis fans 108 are each characterized by component identity information that uniquely identifies the particular component as being unique and distinct from other equivalent components. In the illustrated embodiment, the component includes a device identifier (DID) or a service tag (ST). Other information may be provided which uniquely identifies the particular components, such as a device model number in combination with a device serial number, a manufacturer's data code, or other information that may serve to uniquely identify a particular instance of the component as being distinct from another instance of the same type of component. In a particular case, the component identity information may include a globally unique identifier (GUID) that represents an identifier ascribed to the particular component by a common, secure, and verifiable identification scheme in accordance, for example, with an Internet Engineering Task Force RFC 4122 or the like.

In a particular embodiment, particularly where a component of information handling system 100 includes a firmware element (for example chassis I/O module 102 and storage module 104), the component identity information may include a secure token based upon the firmware version installed into the component. For example, a hash of the firmware version may be provided in association with the DID/ST for chassis I/O module 102 and storage module 104. In this way, it can be determined whether or not the particular components have had their firmware elements tampered with.

Server blades 110 are each characterized by particular component identity information that uniquely identifies the particular server blade as being unique and distinct from other instances of the same type of server blades. In this regard, the component identity information may include a DID, or a ST, or other information as described above (for example a GUID). In addition, server blades 110 may not have just unique component identity information as described herein, but may also incorporate secured component verification (SCV) information that provides a fingerprint for an attested state of each of the server blades, as provided by a manufacturer of the server blades. The identification and verification of the individual elements of server blades 110 are captured at the time of manufacture, and a SCV token is ascribed to the completed server blades. Thus, when each of blade servers 110 are powered on, the integrity of the elements resident in each blade server can be assured by comparing the SCV token with a calculated SCV token for the blade server when it is booted. Then, if the SCV token does not match the calculated SCV token, the elements of the particular server blade will be understood to have been tampered with, and steps may be taken to isolate the particular server blade and to resolve any discrepancies.

BMC 120 represents one or more processing devices, such as a dedicated BMC System-on-a-Chip (SoC) device and one or more additional devices, as needed or desired. BMC 120 provides an out-of-band (OOB) mechanism to monitor, manage, and maintain information handling system 100, such as by providing BIOS/UEFI or system firmware updates, managing non-processing components of the blade server, such as system cooling fans and power supplies, and monitoring, managing, and maintaining the operating environments instantiated on server blades 110. BMC 120 is connected to chassis I/O module 102, storage module 104, PSU 106, chassis fans 108, and blade servers 110 by a management interface. Such a management interface may include a two-wire interface such as an Inter-Integrated Circuit (I2) interface, an Improved Inter-Integrated Circuit (I3) interface, or the like, or may include a virtual a virtual local area network (VLAN) established utilizing a Network Controller Sideband Interface (NC-SI) or another management protocol, as needed or desired. The management interface implements a management protocol, such as an Intelligent Platform Management Interface (IPMI) interface.

In order to ensure the security of the environment of an information handling system, the identity information for the components of the information handling system may be utilized to provide a validity state, such as a cryptographic hash, for the information handling system to keep it secure from malicious tampering. However, in a typical security environment, the valid state is applied to the information handling system as a whole. That is, the cryptographic hash is provided on a set of data that describes the entire information handling system, including the component identity information for each of the validated components. In this case, whenever the information handling system is booted, or the validity of the information handling system is desired to be verified, the entire validity state of the information handling system must be evaluated, to determine if a current operating state matches an originally validated state. However, when the current operating state fails to match the valid state, it may not be readily apparent which component of the valid state has been changed.

In particular, a validation failure indicates only that the current operating state of the information handling system is different from the validated state, and it is not readily determinable which component of the information handling system caused the validation failure because the validity state is generated upon the entirety of the information handling system. Thus, when the current operating state of the information handling system fails to match the originally validated state, there is little to be done to mitigate the validation failure, aside from halting the further operation of the information handling system and providing an indication to a system administrator or the like. Further still, the process to revalidate the operating state of the information handling system typically requires a dedicated, and often manual, effort to reestablish the validity state of the information handling system.

BMC 120 operates to implement a chassis component lockdown mode (CCLM) that provides an option to monitor, mange, and maintain the integrity of the individual components of information handling system 100. In particular, in CCLM mode, BMC 120 receives the component identity information associated with chassis I/O module 102, storage module 104, PSU 106, chassis fans 108, and blade servers 110, and provides a validity state for each component individually based upon the component identity information. Then BMC 120 monitors the operating state of information handling system 100, and particularly the component identity information of the components therein, and evaluates whether or not any of the components have been removed or replaced, if any new components have been added to the information handling system, or if any of the components have been otherwise tampered with, based upon the validity states or each individual component. BMC 120 includes a CCLM register 122 that operates to enable the CCLM mode operations on information handling system 100. When CCLM register 122 is cleared, information handling system 100 operates without controls on the status of the components installed into the information handling system, and when the CCLM register is set, the information handling system operates to control the functions of the installed components as described further below.

BMC 120 includes a fully homomorphic encryption (FHE) engine 124, and a component movement policy (CMP) table 126 that are utilized in conjunction with the control functions provided by the BMC when CCLM register 122 is set. CMP table provides entries associated with the components of information handling system 100, along with actions associated with various events that occur in conjunction with the various components, as described further below, and FHE engine 124 provides FHE encryption on the entries of the CMP table. Here, FHE engine employs a FHE encryption algorithm that permits the performance of computations upon the encrypted data without first having to decrypt the data. Further, the FHE encryption algorithm produces the results of the computations in the fully encrypted state. In this way, the components of information handling system 100 are securely logged and bound to the information handling system without providing the opportunity to maliciously manipulate the components of the information handling system.

In particular components that have been newly placed into information handling system 100 will not be represented by any entries in CMP table 126, and can be isolated from operating within the information handling system. Similarly where a firmware element of a particular component has been tampered with, altering the component identity information for that component, the component identity information from the compromised component will not match the component identity information encoded in CMP table 128 for that component, and that component can be isolated from operating within information handling system 100. In order to further secure the operation of information handling system 100 from tampering, CMP table 126 is stored in a secure memory device of the information handling system associated with BMC 120.

Each entry in CMP table 126 includes a component field, a component identity information field for the associated component, at least one event field associated with the component, and an action field associated with each event. In the illustrated example, CMP table 128 incudes entries for server blades 110, chassis I/O module 102, storage module 104, PSU 106, and chassis fans 108. The exemplary entry for the server blade (A) (i.e., server blade 100 installed in a first slot of the chassis of information handling system 100) includes the component identity information (DID/SCV) associated with server blade (A) in the identity field, and the event fields associated with server blade (A) include an "insert" event field to be utilized in the event of a detected insertion of server blade (A), and a "remove" event field to be utilized in the event of a detected removal of server blade (A). The "insert" event field is associated with a "block" action field and the "remove" event field is associated with a "notify" action field. For exemplary server blade (A), the identity field, the event fields, and the action fields are surrounded by a darkened block, indicating that the enclosed fields are encoded by FHE engine 124 as a secured entry in CMP 126. CMP table 126 includes an ellipsis, indicating that the additional server blades (B-H) will include similar entries to the illustrated server blade entry.

The exemplary entry for chassis I/O module 102 includes the component identity information (DID/ST/FW) associated with chassis I/O module in the identity field, and the event fields associated with the chassis I/O module include an "insert" event field, a "remove" event field, and a "firmware" event field. The "insert" event field is associated with a "permit" action field, the "remove" event field is associated with an "alert" action field, and the "firmware" field is associated with a "block" action field. For chassis I/O module 102, the identity field, the event fields, and the action fields are surrounded by a darkened block, indicating that the enclosed fields are encoded by FHE engine 124 as a secured entry in CMP 126.

The entries for storage module 104, PSU 106, and chassis fans 108 may be understood to be similar to the entries for server blade (A) and chassis I/O module 102, as described above. In particular, it may be understood that CMP table 126 represents a view of the topography of information handling system 100, with pre-populated entries associated with each installable component of the information handling system (such as for each plug-in connector on the chassis), but where the various fields remain empty until CCLM register 122 is set, at which time, the actual components that are installed into the information handling system are characterized and the fields are populated, as described further below. In this way, the actual configuration of information handling system 100 is flexibly handled in the CCLM mode. For example, if information handling system 100 includes four (4) expansion sockets that can be populated with either chassis I/O modules or storage modules, the associated CMP table may include four (4) entries, one for each expansion socket. Then, when the CCLM mode is enabled, the actual population of the expansion slots will be captured in the CMP table. The same flexibility may be provided with regard to two (2) or more PSU slots or two (2) or more chassis fan slots, or for any other types of add-in sockets (for example PCI-e sockets, memory module sockets, small form factor (SFF) sockets, or the like), as needed or desired.

Other types of events may be provided by the event fields, as needed or desired. For example, a chassis intrusion detection event may be associated with an entry for the chassis itself, a firmware checksum or other integrity measure may be applied to BMC 120, or other types of events may be provided as needed or desired. When an action field includes a "block" entry, BMC 120 blocks the associated component from booting up or otherwise being utilized within information handling system 100, until such time that the component can be authorized for use on the information handling system. The establishment of the authorization of the particular component may be provided by a system administrator, a central authorization authority or the like. Then when the particular component has been authorized, BMC 120 generates a new set of event fields and action fields associated with the authorized component's component identity information, the new entry is FHE encoded by FHE engine 124, and the new encoded entry is populated into CMP table 126.

Other activities may be provided in association with a "block" entry, such as the creation of a high-priority alert to a datacenter management system, the broadcast of an on-call support message for the component, or the like. When an action field includes a "notify" entry, BMC 120 provides a notification of the event. The notification may include the creation of a notification to a datacenter management system, the broadcast of an on-call support message for the component, or the like. The "alert" action is similar to the "notify" action, but where the "alert" action may be deemed to be a higher priority than the "notify" action, necessitating a response from the datacenter management system, as needed or desired. Other actions may be provided as needed or desired. For example, various levels or types of restricted use actions may be provided that permit a degraded capacity or restricted access to the resources associated with the associated component, as needed or desired.

In a particular embodiment, if a particular component, such as server blade (A) as illustrated here, has been previously installed into information handling system 100, then the action associated with the insertion of server blade (A) may be a "permit" action that permits server blade (A) to be booted. If the component identity information for server blade (A) remains the same (that is, there have been no hardware or firmware changes, as attested by the SCV information for server blade (A)), then there is no problem with reinstalling server blade (A) within information handling system 100. However, if the component identity information for server blade (A) has changed in any way, such as by failing a SCV verification, then the physical server blade is, for the purposes of CMP table 126, deemed to be a new component, and must be reauthorized as described above.

When the CCLM mode is first enabled on information handling system 100, BMC 100 provides a CCLM enablement phase to provide an initially populated CMP table 126. Thus, when a system administrator sets CCLM register 122, BMC 120 operates to gather an inventory of the components that are currently populating information handling system 100. The inventory includes the component identity information for each component. BMC 120 then provides the inventory to the system administrator or central authorizing authority for evaluation of the inventoried components. The system administrator or other central authorizing authority provides an authorization for each component, a set of events associated with each component, and a set of actions associated with each action to BMC 120. Then, for each authorized component, BMC 120 compiles a CMP table entry, submits the CMP table entry to FHE engine 124 for encryption, and stores the encrypted CMP table entry to the associated entry of CMP table 126. At this point, CMP table 126 is populated with entries for each of the authorized components of information handling system 100, and any unauthorized components will be isolated or otherwise disabled from operating on the information handling system.

After the enablement phase, as described above, BMC 120 operates to monitor information handling system 100 for any changes to the components installed into information handling system 100. When a change to the components installed into information handling system 100 is detected, BMC 120 evaluates the component that changed to determine if the component is associated with an entry in CMP table 126. If an entry for the component exists in CMP table 126, then BMC 120 performs the action associated with the event. If the change involves the removal of the component, then BMC 120 invalidates the entry associated with the component in CMP table 126. If the change involves the installation of a previously installed component, then BMC 120 performs the action associated with the installation, which may include permitting the component to be utilized in information handling system.

This is because if the change involves the same component, but with for example different firmware, then for the purposes of evaluating the component, BMC 120 counts that component as a new component that needs reauthorization. This case is similar to a determination that no entry for the component exists in CMP table 126. In either case, BMC 120 operates to provide an alert to a system administrator or other central authorizing authority to obtain an authorization for the new component. If the system administrator or central authorizing authority fails to provide the authorization for the component, then BMC 120 disables the new component, and continues monitoring for component changes. If the system administrator or central authorizing authority provides the authorization for the component, then BMC 120 receives the associated policy information, enforces the associated policy for the component, and generates a new CMP table entry for encoding and storing into CMP table 126.

In a particular embodiment, CMP table 126 includes multiple entries associated with each plug-in connector in the chassis of information handling system 100, or otherwise securely stores previously utilized entries from the CMP table. Then, when a component that was previously authorized to be utilized on information handling system 100 is reinstalled into the information handling system, the reinstalled component can be utilized without necessitating any action to reauthorize the reinstalled component. When BMC 120 detects a newly installed component, the BMC first searches CMP table 126 to determine if the component is represented by a current entry in the CMP table. If not, then BMC 120 searches the prior entries to determine if the component was previously authorized to be utilized on information handling system 100. If a prior entry is found, BMC 120 performs the action associated with the event for the reinstalled component, moves the prior entry to the current location in CMP table 126, and retires the current entry. Then, only if the installed component fails to match either a current or past entry, does BMC 120 provide the alert to authorize the installed component. In this way, information handling system 100 retains the ability to utilize previously authorized components without having to reauthorize reinstalled components, and the number of authorization requests to the system administrator or central authorizing authority is reduced.

Figure 2:
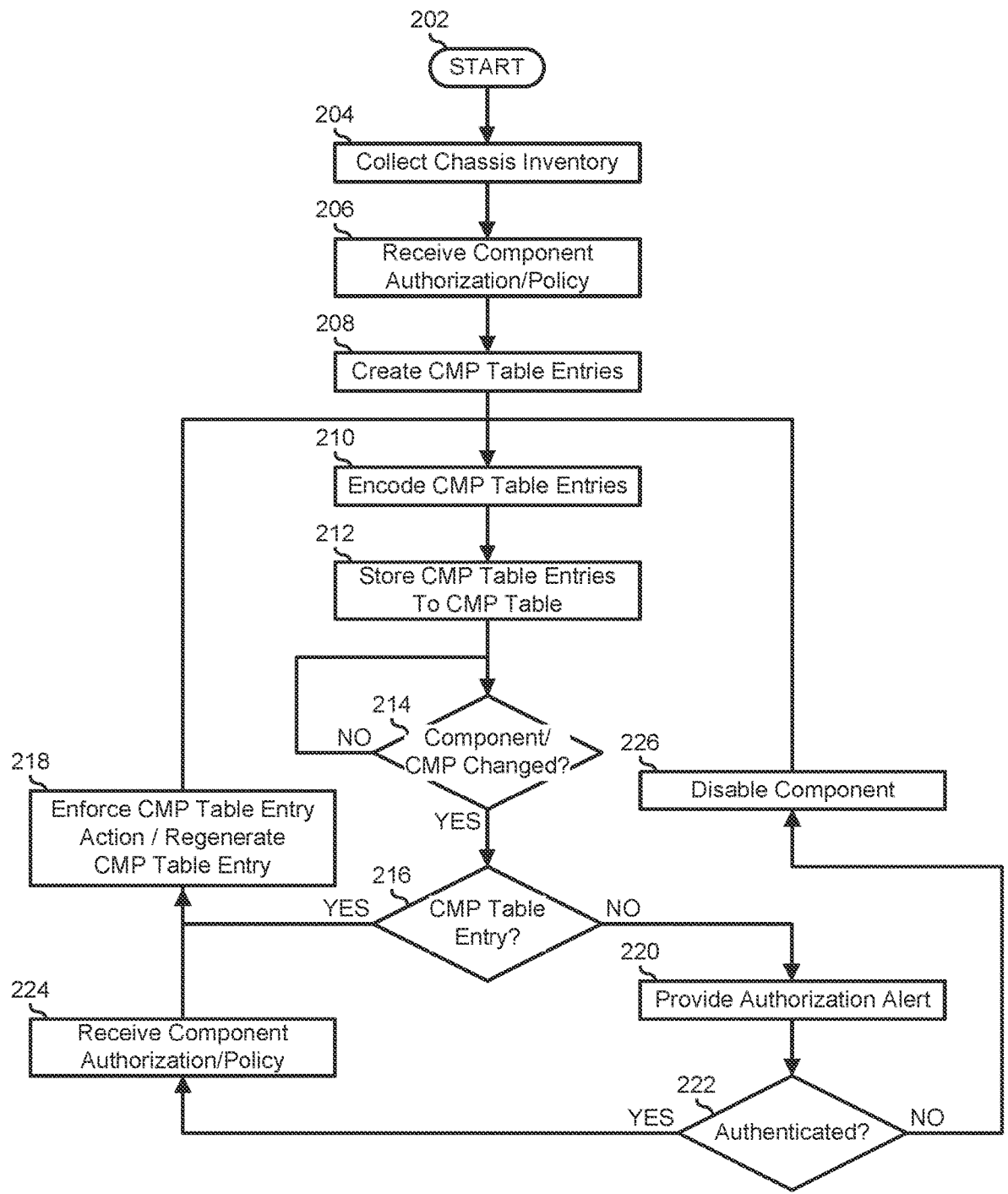
FIG. 2 is a flowchart illustrating a method for authorizing enterprise modular chassis component movement using fully homomorphic encryption (FHE) according to an embodiment of the current disclosure.

FIG. 2 illustrates a method 200 for authorizing enterprise modular chassis component movement using FHE, starting at block 202. An information handling system in CCLM mode collects an inventory of the components that are currently populating the information handling system, and provides the inventory to the system administrator or central authorizing authority for evaluation of the inventoried components in block 204. A system administrator or other central authorizing authority provides an authorization for each component, a set of events associated with each component, and a set of actions associated with each action to the information handling system in block 206. A CMP table entry for each authorized component is compiled in block 208, the CMP table entries are submitted to a FHE engine for encryption with a FHE algorithm in block 210, and the encrypted CMP table entries are stored to an associated entry of a CMP table in block 212.

The decision is made as to whether or not any components of the information handling system or entries of the CMP table have changed in decision block 214. If not, the "NO" branch of decision block 214 is taken and the method returns to decision block 214 until it is determined that a component has changed. When a component has changed, the "YES" branch of decision block 214 is taken and a decision is made as to whether or not the changed component has an associated CMP table entry in decision block 216. If so, the "YES" branch of decision block 216 is taken, the action associated with the event in the CMP table entry is taken and the CMP table entry is regenerated in block 218, and the method returns to block 210 where the regenerated CMP table entry is reencoded utilizing the FHE algorithm. If the changed component does not have an associated CMP table entry, the "NO" branch of decision block 216 is taken and an authorization alert is provided in block 220. A decision is made as to whether or not the component change has been authorized in decision block 222. If so, the "YES" branch of decision block 222 is taken, the authorization, a set of events associated with the component, and a set of actions associated with each action is received in block 224 and the method returns to block 218 where the action associated with the event in is taken and a CMP table entry for the component is regenerated. If the component change has not been authorized, the "NO" branch of decision block 222 is taken, the component is disabled in block 226, and the method returns to decision block 210 where the CMP table entries are encoded.

Figure 3:
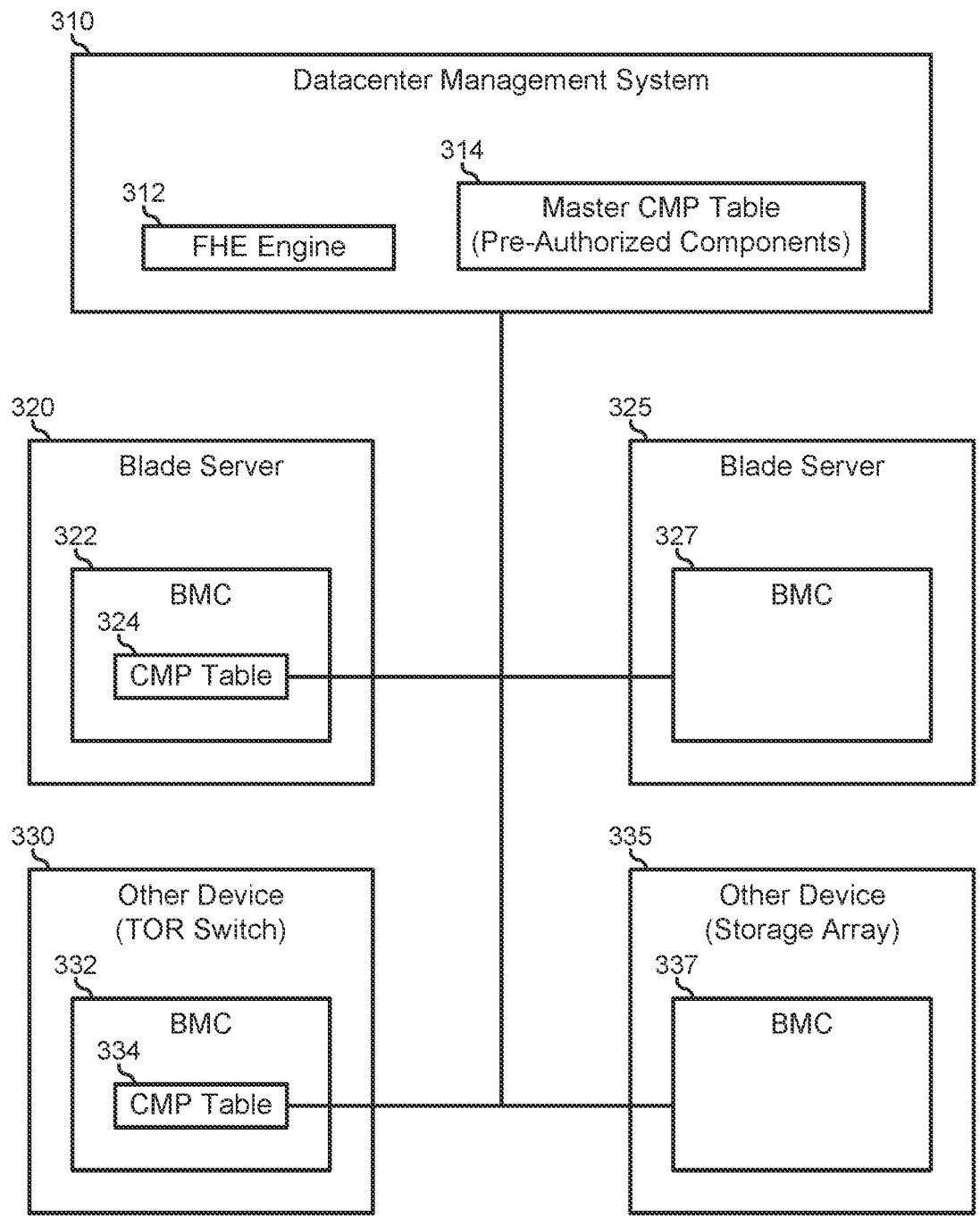
FIG. 3 is a block diagram of a datacenter according to an embodiment of the current disclosure.

FIG. 3 illustrates a datacenter 300 including a management system 310, blade servers 320 and 325, and other systems 330 and 335 (here illustrated as a top of rack (TOR) switch 330, and a storage array 340). Datacenter 300 is provided to illustrate that the current embodiments are extensible to various scales, and with systems that implement different architectures for monitoring, managing, and maintaining the security of the components within the systems. In this regard, a system will be understood to represent an assemblage of inventoried or inventoriable components as needed or desired. Blade server 320 and TOR switch 330 may be understood to be similar to information handling system 100, in at each include a respective BMC 322 and 332 that each implement a CCLM mode and that each include a respective CMP table 324 and 334 that operates to monitor, manage, and maintain the security of the components of the blade server and the TOR switch, as described above. In contrast, blade server 325 and storage array 335 each include a respective BMC 327 and 337, but these BMCs do not implement the CCLM mode and do not include CMP tables.

Datacenter management system 310 includes a FHE engine 312 and a master CMP table 314. As such datacenter management system 310 will be understood to implement a datacenter component lockdown mode (DCLM) that operates on the components of datacenter 300 similarly to how the CCLM mode operates on the components of information handling system 100. In the case where the systems of datacenter 300 implement the CCLM mode (that is blade server 220 and TOR switch 230), datacenter management system 300 operates to import the elements from CMP tables 324 and 334 into master CMP table 314. Then when one of BMCs 322 or 332 detect that a component of respective blade server 320 or TOR switch 330 has changed, the particular BMC operates to provide a change alert to datacenter management system 310. Because datacenter management system 310 maintains the security over all of the elements within all of the systems of datacenter 300, the datacenter management system will be understood to retain a deeper pool of pre-authorized components than the individual systems of the datacenter. Thus datacenter management system 310 can quickly provide authorization information to blade server 320 or TOR 330 more quickly, and with less frequent calls to an outside component authorization authority.

In the case where the systems of datacenter 300 do not implement the CCLM mode (that is, blade server 225 and storage array 235), datacenter management system 300 operates more extensively to implement the DCLM mode. In particular, because blade server 325 and storage array 335 do not implement the CCLM mode, they do not have a prepared inventory of the components installed therein. As such, datacenter management system 310 operates to direct BMCs 327 and 337 to gather an inventory of the components that are currently populating respective blade server 320 and storage array 330 and to provide the inventories back to the datacenter management system. The inventories include the component identity information for each component within blade server 325 and storage array 335.

Datacenter management system 310 then evaluates the received inventory information to determine an authorization state for the components within the inventories. Here again, datacenter management system 310 will be understood to retain a deep pool of pre-authorized components, and may thus be able to populate master CMP table 314 with entries associated with any pre-authorized components. On the other hand, any components that are not pre-authorized may need to be authorized, for example by a system administrator or a central authorization authority, as needed or desired. For any components that are not authorized, datacenter management system 310 directs the particular BMC 327 or 337 to isolate the component or otherwise disable the component from operating on the particular system. At this point, master CMP table 314 is fully populated, and the then current operating state of datacenter 300 is secured.

After the enablement phase, as described above, datacenter management system 310 directs BMCs 324 and 334 to operate in accordance with the CCLM mode, as described above, except that any changes to respective CMP tables 324 and 334 will be provided back to the datacenter management system for incorporation into master CMP table 314. Datacenter management system 310 further directs BMCs 327 and 337 to monitor respective blade server 325 and storage array 335 for any changes to the components installed into those systems. When a change to the components installed into one of blade server 325 or storage array 335 is detected, the associated BMC 327 or 337 provides an indication of the change to datacenter management system 310 for evaluation. If the component associated with the detected change is also associated with an entry in master CMP table 314 or is included in the pre-authorized components, then datacenter management system 310 directs the associated BMC 327 or 337 to perform the action associated with the particular component.

If the component associated with the detected change is not associated with any entry in master CMP table 314 or is not included in the pre-authorized components, then datacenter management system 310 attempts to authorize the component, such as by direction of a system administrator or a central authorization authority. If the component becomes authorized, datacenter management system 310 creates a new entry associated with the component and stores the entry in master CMP table 314, and directs the associated BMC 327 or 337 to perform the action associated with the particular component entry. In this way, the components of a datacenter are secured against tampering or mistaken alteration by the implementation of the DCLM mode on the datacenter. Further, the implementation of the DCLM mode permits the extension of the security cover the components of both systems that themselves implement a CCLM mode, and to systems that do not implement a CCLM mode.

Figure 4:
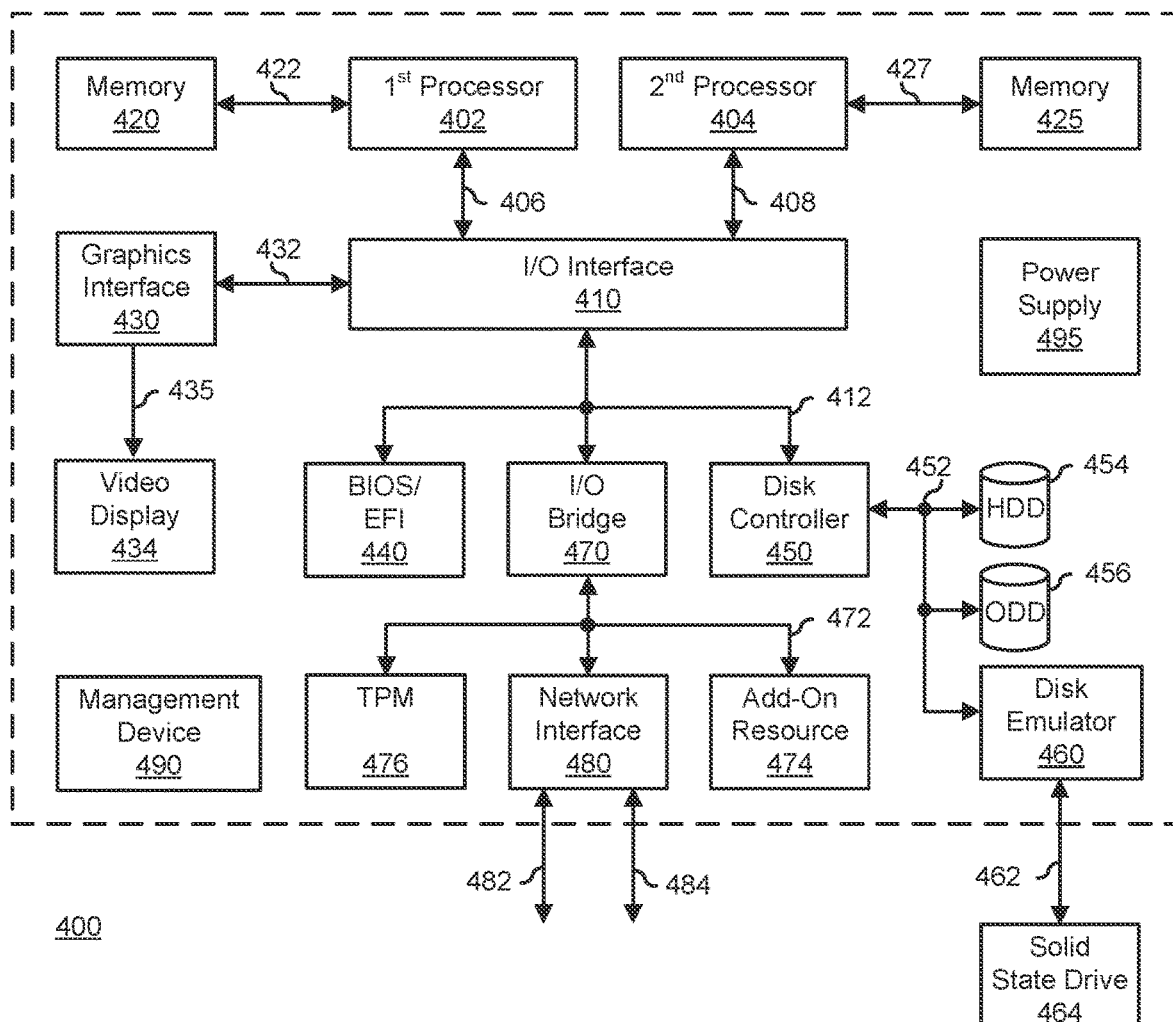
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first add-in slot configured to receive components of a first type; and
   a baseboard management controller configured 1) to receive a first identifier from a first component installed into the first add-in slot, the first identifier to uniquely identify the first component from any other component of the first type, 2) to determine whether a first entry in an encoded component table includes the first identifier, the first entry being associated with the first add-in slot, 3) to determine a first action to perform for the first component in response to determining that the first entry includes the first identifier, 4) to perform the first action for the first component, 5) to send a request to authorize the first component to a management system in response to determining that the first entry does not include the first identifier, 6) to receive a response to the request that the first component is authorized, and 7) in response to permit the first component to operate on the information handling system.

2. The information handling system of claim 1, wherein in performing the first action, the baseboard management controller is further configured to provide a notification to a management system that the first component has been installed into the first add-in slot.

3. The information handling system of claim 1, wherein the baseboard management controller is further configured to create a new first entry that includes the first identifier in response to determining that the first entry does not include the first identifier, to encode the new first entry, and to store the new first entry to the component table.

4. The information handling system of claim 1, wherein the baseboard management controller is further configured to receive a response to the request that the first component is not authorized, and in response to disable the first component from operating on the information handling system.

5. The information handling system of claim 1, wherein, prior to determining that the first entry includes the first identifier, the baseboard management controller is further configured to send a request to authorize the first component to a management system, to receive a response to the request that the first component is authorized, and in response to permit the first component to operate on the information handling system, to create the first entry, to encode the first entry, and to store the first entry to the component table.

6. The information handling system of claim 1, further comprising:
   a second add-in slot configured to receive components of a second type;
   wherein the baseboard management controller is further configured 1) to receive a second identifier from a second component installed into the second add-in slot, the second identifier to uniquely identify the second component from any other component of the second type, 2) to determine whether or not a second entry in the component table includes the second identifier, the second entry being associated with the second add-in slot, 3) to determine a second action to perform for the second component in response to determining that the second entry includes the second identifier, and 4) to perform the second action for the second component.

7. The information handling system of claim 6, wherein the first and second entries are encoded utilizing a fully homomorphic encryption algorithm.

8. The information handling system of claim 7, wherein in determining whether or not the first entry in the component table includes the first identifier, the fully homomorphic encryption algorithm is configured to operate on the first entry and not on the second entry.

9. The information handling system of claim 6, wherein the first type and the second type are a same type.

10. A method, comprising:
    providing, on an information handling system, a first add-in slot configured to receive components of a first type;
    providing, on the information handling system, a baseboard management controller;
    receiving, by the baseboard management controller, a first identifier from a first component installed into the first add-in slot, the first identifier to uniquely identify the first component from any other component of the first type;

determining whether a first entry in an encoded component table includes the first identifier, the first entry being associated with the first add-in slot;

determining a first action to perform for the first component in response to determining that the first entry includes the first identifier;

performing the first action for the first component;

sending a request to authorize the first component to a management system in response to determining that the first entry does not include the first identifier;

receiving a response to the request that the first component is authorized; and in response, permitting the first component to operate on the information handling system.

11. The method of claim 10, wherein in performing the first action, the method further comprises providing a notification to a management system that the first component has been installed into the first add-in slot.

12. The method of claim 10, further comprising:

in response to determining that the first entry does not include the first identifier:
  creating a new first entry that includes the first identifier;
  encoding the new first entry; and
  storing the new first entry to the component table.

13. The method of claim 10, further comprising:

receiving a response to the request that the first component is not authorized; and in response, disabling the first component from operating on the information handling system.

14. The method of claim 10, wherein, prior to determining that the first entry includes the first identifier, the method further comprises:

sending a request to authorize the first component to a management system;

receiving a response to the request that the first component is authorized; and in response:
  permitting the first component to operate on the information handling system;
  creating the first entry;
  encoding the first entry; and
  storing the first entry to the component table.

15. The method of claim 10, further comprising:

providing a second add-in slot configured to receive components of a second type;

receiving a second identifier from a second component installed into the second add-in slot, the second identifier to uniquely identify the second component from any other component of the second type;

determining whether or not a second entry in the component table includes the second identifier, the second entry being associated with the second add-in slot;

determining a second action to perform for the second component in response to determining that the second entry includes the second identifier; and performing the second action for the second component.

16. The method of claim 15, wherein the first and second entries are encoded utilizing a fully homomorphic encryption algorithm.

17. The method of claim 16, wherein in determining whether or not the first entry in the component table includes the first identifier, the method further comprises:

operating, by the fully homomorphic encryption algorithm, on the first entry and not on the second entry.

18. A blade server, comprising:

an add-in slot configured to receive server blades; and a baseboard management controller configured 1) to receive an identifier from a server blade installed into the add-in slot, the identifier to uniquely identify the server blade from any other server blade, 2) to determine whether an entry in an encoded component table includes the identifier, the entry being associated with the add-in slot, 3) to determine an action to perform for the server blade in response to determining that the entry includes the identifier, 4) to perform the action for the server blade, 5) to send a request to authorize the server blade to a management system in response to determining that the first entry does not include the first identifier, 6) to receive a response to the request that the server blade is authorized, and 7) in response to permit the server blade to operate on the blade server.

* * * * *